(12) United States Patent
Schenk

(10) Patent No.: US 6,370,206 B1
(45) Date of Patent: Apr. 9, 2002

(54) ADAPTIVE CAP RECEIVER AND METHOD FOR CONTROLLING A CAP RECEIVER

(75) Inventor: Heinrich Schenk, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/729,064

(22) Filed: Dec. 4, 2000

Related U.S. Application Data

(63) Continuation of application No. PCT/EP99/01890, filed on Mar. 17, 1999.

(30) Foreign Application Priority Data

Jun. 4, 1998 (EP) .............................................. 98110217

(51) Int. Cl.$^7$ ............................ H03D 1/24; H03H 7/30; H03H 7/40; H03K 5/159
(52) U.S. Cl. ......................... 375/321; 375/231; 375/235
(58) Field of Search .................................. 375/321, 231, 375/235

(56) References Cited

U.S. PATENT DOCUMENTS

| | | | | |
|---|---|---|---|---|
| 4,032,762 A | * | 6/1977 | Caloyannides | 235/152 |
| 5,499,268 A | * | 3/1996 | Takahashi | 375/231 |
| 5,661,528 A | * | 8/1997 | Han | 348/607 |
| 5,859,871 A | * | 1/1999 | Cook | 375/235 |
| 6,067,319 A | * | 5/2000 | Copeland | 375/232 |

\* cited by examiner

Primary Examiner—Chi Pham
Assistant Examiner—Tony Al-Beshrawi
(74) Attorney, Agent, or Firm—Herbert L. Lerner; Laurence A. Greenberg; Werner H. Stemer

(57) ABSTRACT

An adaptive CAP filter includes a clock-controlled A/D converter for converting an input signal, a digital level-control circuit, an adaptive controlled reception filtering system with two parallel filters and a downstream decision maker for outputting reconstructed signal coordinates. The digital level-control circuit and the adaptive reception filtering system are decoupled by virtue of the fact that either an adjustment of the digital level-control circuit or a coefficient adjustment of the adaptive reception filtering system is active. A method for controlling a cap receiver is also provided.

13 Claims, 3 Drawing Sheets

ADAPTIVE CAP RECEIVER AND METHOD FOR CONTROLLING A CAP RECEIVER

CROSS-REFERENCE TO RELATED APPLICATION

This application is a continuation of copending International Application No. PCT/EP99/01890, filed Mar. 17, 1999, which designated the United States.

BACKGROUND OF THE INVENTION

Field of the Invention

The invention relates to an adaptive CAP receiver and relates, in particular, to a method for driving individual control loops of an adaptive CAP receiver, in order to ensure stable start-up and stable operation of the receiver.

An AT&T and Bellcore article entitled: Design of Digital Carrierless AM/PM Transceivers, TEI.1.4/92-149, Aug. 19, 1992, provides an introduction to the layout of digital, carrierless CAP transceivers and receivers. Therefore, basic structures will only be described briefly herein.

When dealing with large amounts of data, a frequency-division multiplex method has been found to be better than a baseband duplex channel method with echo compensation for duplex data transmission through subscriber access lines. That is the case despite the greater bandwidth which is required, since crosstalk which is dominant in that speed range can be suppressed by selective filtering. Thus, for rapid data transmission in the telephone subscriber access area, single-carrier methods such as QAM (Quadrature Amplitude Modulation) and CAP (Carrierless Amplitude/Phase modulation) are currently being discussed under the keyword VDSL (Very high bit rate Digital Subscriber Line). That is because they allow the various frequency bands to be achieved for outward and return directions in a simple manner by a suitable selection of carrier and mid-frequencies. The data rates in that case vary over a range from about 2 Mbit/s to 50 Mbit/s. In that case, both symmetrical and asymmetrical operation are intended to be possible. Symmetrical operation, that is to say equal data rates in both directions, is generally required for commercial applications, while asymmetrical operation, that is to say different data rates in the two directions, is generally sufficient in the private area (high data rate to the subscriber, low data rate to the service provider).

Until now, the discrete multitone method has been standardized in the ADSL Standard (Asymmetric Digital Subscriber Line). However, it can be assumed that single-carrier methods using CAP technology will also be standardized in that application area.

In a CAP system, the binary data are assembled into groups of bits at the transmission end, and are supplied to a coder. That allocates a point in a two-dimensional signal space to each of the $2^L$ combinations. That point is defined by Cartesian co-ordinates (x, y). That signal point may also be regarded as a point in complex number planes.

A CAP modulator will be initially considered. The signal points to be transmitted, which are defined by two Cartesian co-ordinates $a_k$ and $b_k$ at a time kT, are sampled at a clock rate (symbol rate) $f_T=1/T$ and are passed to separate sub-channels, each of which contains a transmission filter. The signals in the two sub-channels are subsequently added, and the transmission signal is passed to the transmission channel.

The received input signal is subjected to A/D conversion at a predetermined sampling rate in a corresponding CAP receiver, which forms a matching element to the CAP transceiver. Digital level regulation is carried out after the digital A/D conversion, in order to set the level of the received/wanted signal to a constant value. Therefore, as far as possible, it is independent of the transmission line and of the crosstalk of the transmission signal of the system, as well as all other out-of-band interference. The samples are passed to the pair of reception filters after digital level regulation. In that case, the coefficients of the filter pair must be adjusted adaptively, starting with a fixed coefficient set, which is configured for a specific line length. After reception filtering, the signal values are sampled at the symbol rate $f_T$, and are passed to a decision maker. That has the task of assigning received data to each received value pair. Once adjustment has been carried out and if the interference is sufficiently low, the received values match the transmitted data values, apart from a constant delay and an additional rotation of the complex data vector through ±90° or ±180°.

Overall, the adaptive CAP receiver includes three control loops, specifically the control of the sampling rate, the control of the digital level adaptation and the control of the filter coefficients. The problem which arises in that case is that stable behavior of the CAP receiver is not ensured in the case of miscoupling of the control loops.

SUMMARY OF THE INVENTION

It is accordingly an object of the invention to provide an adaptive cap receiver and a method for controlling a cap receiver, which overcome the hereinafore-mentioned disadvantages of the heretofore-known methods and devices of this general type and which decouple control loops of the CAP receiver in order to ensure stable behavior of the CAP receiver. With the foregoing and other objects in view there is provided, in accordance with the invention, a method for controlling a CAP receiver, which comprises converting an input signal with a clock-controlled A/D converter; providing a digital level-control circuit; providing an adaptive controlled reception filtering system with two parallel filters; providing a decision maker for outputting reconstructed signal coordinates; decoupling the digital level-control circuit and the adaptive reception filtering system by activating either an adjustment of the digital level-control circuit or a coefficient adjustment of the adaptive reception filtering system; and decoupling clock control of the A/D converter and the adaptive reception filtering system.

With the foregoing and other objects in view there is provided, in accordance with the invention, an adaptive CAP receiver, comprising a clock-controlled A/D converter for converting an input signal; a digital level-control circuit; an adaptive controlled reception filtering system with two parallel filters; a decision maker for outputting reconstructed signal coordinates; and control of a sampling clock, a digital level and the adaptive reception filtering system according to the method.

In accordance with another mode of the invention, two ENABLE signals are generated in order to control the decoupling, the first ENABLE signal activating the digital level-control circuit, and the second ENABLE signal activating the coefficient adjustment of the adaptive reception filtering system.

In accordance with a further mode of the invention, the mean value of the two decision errors and the mean value of the reception level are used to generate the ENABLE signals.

In accordance with an added mode of the invention, the mean value for the reception level is compared with a prescribed reference value, with the first ENABLE signal being set to one and the second ENABLE signal being set to zero when the mean value is greater than the reference value.

In accordance with an additional mode of the invention, if the mean value of the received level is smaller than the reference value, the first ENABLE signal is set to zero, although in this case the second ENABLE signal is not set to one until the mean decision error is smaller than a predetermined threshold.

In accordance with yet another mode of the invention, only a four-stage CAP signal is used when operating in a starting phase, that is to say as the CAP receiver is starting up.

In accordance with yet a further mode of the invention, the level-control circuit controls the gain in such a way that a prescribed level value is yielded at the output of the reception filter pair.

In accordance with yet an added mode of the invention, the respective decision error is used to control the coefficient adjustment.

In accordance with a concomitant mode of the invention, the clock control is derived from the values upstream and downstream of the decision maker and from a coefficient of the filter pair.

Other features which are considered as characteristic for the invention are set forth in the appended claims.

Although the invention is illustrated and described herein as embodied in an adaptive CAP receiver and a method for controlling a cap receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
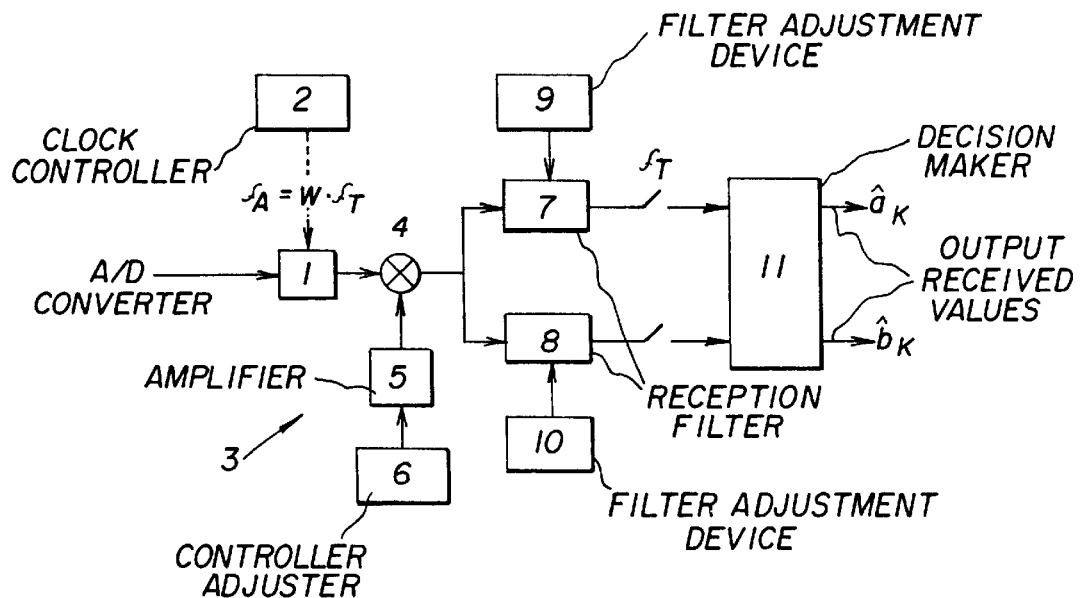
FIG. 1 is a block diagram of an adaptive CAP receiver.

Referring now to the figures of the drawings in detail and first, particularly, to FIG. 1 thereof, there is seen a block diagram of an adaptive CAP receiver. A received signal I is converted into a digital received signal in an A/D converter 1 with a frequency of $f_A$, which is an integral multiple of a sampling frequency $f_T$ ($f_A = w \cdot f_T$). The frequency of the sampling of the A/D conversion can be controlled through a clock controller 2. Digital level regulation is carried out downstream of the A/D converter 1 with a level regulator or control circuit 3. The level regulator 3 includes a multiplier 4 and a controllable amplifier 5, in order to set the level of the received signal to a constant value as independently as possible of the transmission line and the crosstalk of the transmission signal of the system, as well as all other out-of-band interference. A gain AGC produced in the amplifier 5 is adjusted by a controller 6. After the digital level regulation, the samples of the received signal are passed to a reception filter pair 7 and 8. The reception filter 7 has a coefficient set hi and the reception filter 8 has a coefficient set h2. The coefficient sets h1, h2 of the filter pair 7 and 8 must be adjusted adaptively, starting with a fixed coefficient set, which is configured for a specific line length. For this purpose, the coefficients of the filters 7 and 8 can be controlled with respective filter adjustment devices 9 and 10. After the reception filtering in the filters 7 and 8, the two signals are sampled at the symbol rate $f_T$ and supplied to a decision maker 11. The decision maker 11 has the task of assigning received data to each received value pair. Once adjustment has been carried out and if the interference is sufficiently low, output received values $â_k$ and $b̂_k$ match transmitted data values, apart from a constant delay and an additional rotation of a complex data vector through ±90° or ±180°.

Figure 2:
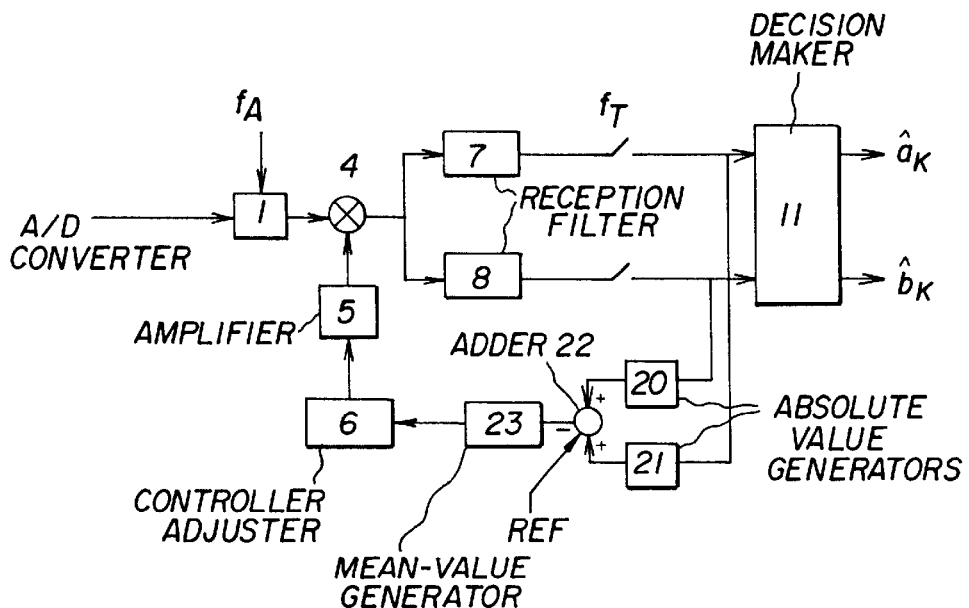
FIG. 2 is a block diagram illustrating a level regulation.

FIG. 2 shows a block diagram illustrating the level regulation. In this case, the controller 6 controls the gain of the amplifier 5 in such a way that a level which can be prescribed with the aid of a specific reference value is yielded at the output of the reception filter pair 7 and 8. The control criterion is therefore determined from the values which are sampled at the symbol rate and are present at the output of the filter pairs 7, 8. This is done by determining the absolute value of the filtered data in absolute-value generators 20 and 21, and by supplying the absolute values and a reference value Ref to an adder 22. After averaging in a mean-value generator 23, a mean value that is produced is supplied to the controller 6 for controlling the gain AGC.

Figure 3:
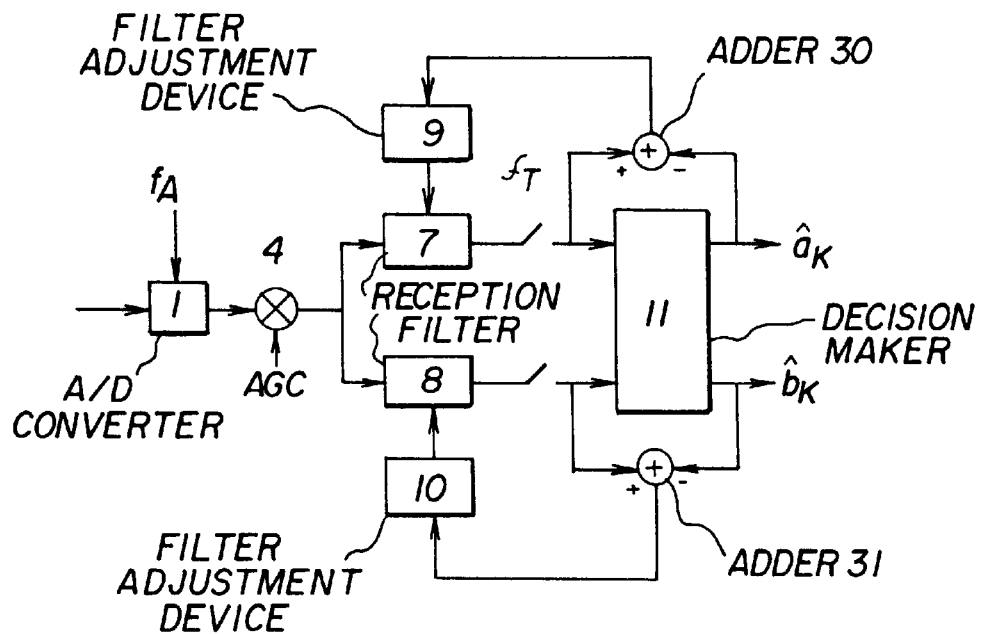
FIG. 3 is a block diagram of a coefficient adjustment circuit.

FIG. 3 shows a block diagram illustrating adjustment of the filter coefficients. In order to adjust the respective filter coefficients, use is made of a decision error of the decision maker 11. In other words, control information for adjusting the filter coefficients is obtained directly from difference values of signals upstream and downstream of the decision maker 11. For this purpose, the signal values of the two filter branches upstream and downstream of the filters 7, 8 are respectively supplied to adders 30, 31, noting that the signal value is in negative form downstream of the decision maker 11. The decision error that is produced can be used directly as a control signal for the respective regulator in order to adjust the filter coefficients. Convergence can be ensured in the case of error-free transmission by using suitable adjustment algorithms. Since many wrong decisions by the decision maker 11 are to be expected when starting to set up a connection, it is not at first possible to expect that the filter pairs 7, 8 will start up reliably. Consequently, at the start use is made initially of a four-stage CAP signal for transmission, in order to keep the number of wrong decisions as low as possible despite maladjustment of the reception filter pair.

With regard to providing an implementation which is as simple as possible, use may be made of the so-called SGN-SGN algorithm for adjusting the coefficients. Filter coefficients are calculated in this case as follows:

$$h_{1n}(i) = h_{1n}(i-1) - 2^{-\mu} \cdot SGN\{y(k-n)\} \cdot SGN(\Delta â_k)$$

and $$h_{2n}(i) = h_{2n}(i-1) - 2^{-\mu} \cdot SGN\{y(k-n)\} \cdot SGN(\Delta b̂_k)$$

in which n=0, . . . , N−1 signifies the number of the coefficient, i signifies the number of a rule step, and k signifies a running time index.

The manipulated variable $2^{-\mu}$ influences the rate of adjustment and the accuracy of the filter adjustment. It is sensible to adjust the value $\mu$ as a function of the mean error. At the start of the filter adjustment and in conjunction with an appropriately large mean error, it is possible to operate with a relatively large manipulation step (small $\mu$) in order to accelerate the starting-up process. The manipulated variable is to be incremented in steps up to its final value as the error becomes smaller.

In contrast therewith, the manipulated variable $2^{-\mu}$ is to be decremented when larger out-of-band interference is present, since the sensitivity of the stop-band attenuation of the reception filters 7, 8 to changes in coefficient is very high. A criterion for the size of the out-of-band interference can be derived by determining the mean value downstream of the level amplifier 3, since the level amplifier 3 only keeps the level of the wanted signal constant. A longer adjustment time is therefore to be expected in the case of out-of-band interference.

Figure 4:
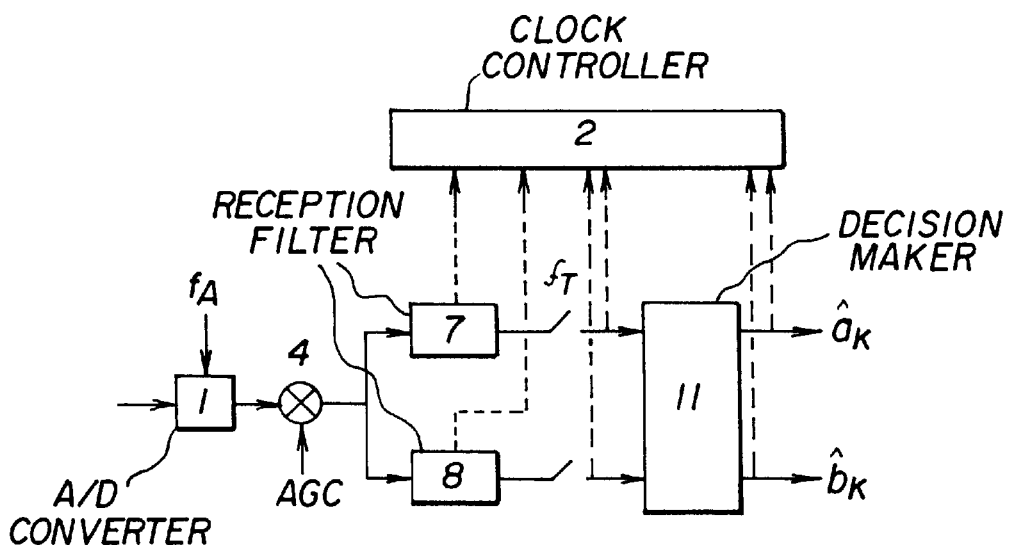
FIG. 4 is a block diagram of a clock controller.

FIG. 4 shows a block diagram illustrating control of the sampling rate. The derivation of information for controlling the sampling rate can likewise be obtained with the aid of the values upstream and downstream of the decision maker 11. With unchanged filter coefficients, a displacement of the sampling phase effects an additional rotation of the received data vector apart from an increase in the symbol interference.

Possible controlled variables are obtained, for example, using:

$$\Theta_k = u_1(k\cdot T)\cdot \hat{b}_k - u_2(k\cdot T)\cdot \hat{a}_k$$

or $$\Theta_k = u_1(k\cdot T)\cdot \Delta\hat{b}_k - u_2(k\cdot T)\cdot \Delta\hat{a}_k$$

Instead of the signal values $u_1(k\cdot T)$ and $u_2(k\cdot T)$ upstream of the decision maker 11, it is also possible to use only their signs $SGN\{u_1(k\cdot T)\}$ and $SGN\{u_g(k\cdot T)\}$, in order to avoid complicated multiplications.

Since in the case of simultaneous adaptive adjustment of the filter coefficients and of controlling the sampling phase there is miscoupling of these two control processes, and therefore an unstable behavior, it is necessary to decouple the two control processes. This can be achieved by the additional weighted addition of a filter coefficient. In this case, the sampling phase is adjusted in such a way as to yield the value zero for the filter coefficient being used. This coefficient should therefore already be as small as possible in the starting solution of the reception filter pair.

In the case of digital sampling phase control, in which the sampling phase can be adjusted discontinuously in defined steps, it is sensible not to carry out the clock adjustment until after averaging over M symbol intervals. The final clock control criterion is therefore yielded as follows:

$$\Theta_{k,M} = \sum_{i=0}^{M-1} [\Theta_{k,M-1}\beta \cdot h_{1,2}(v)]$$

In this case, the value v signifies the number of the coefficients of the reception filters 7 or 8, and the value $\beta$ signifies the evaluation coefficient.

Figure 5:
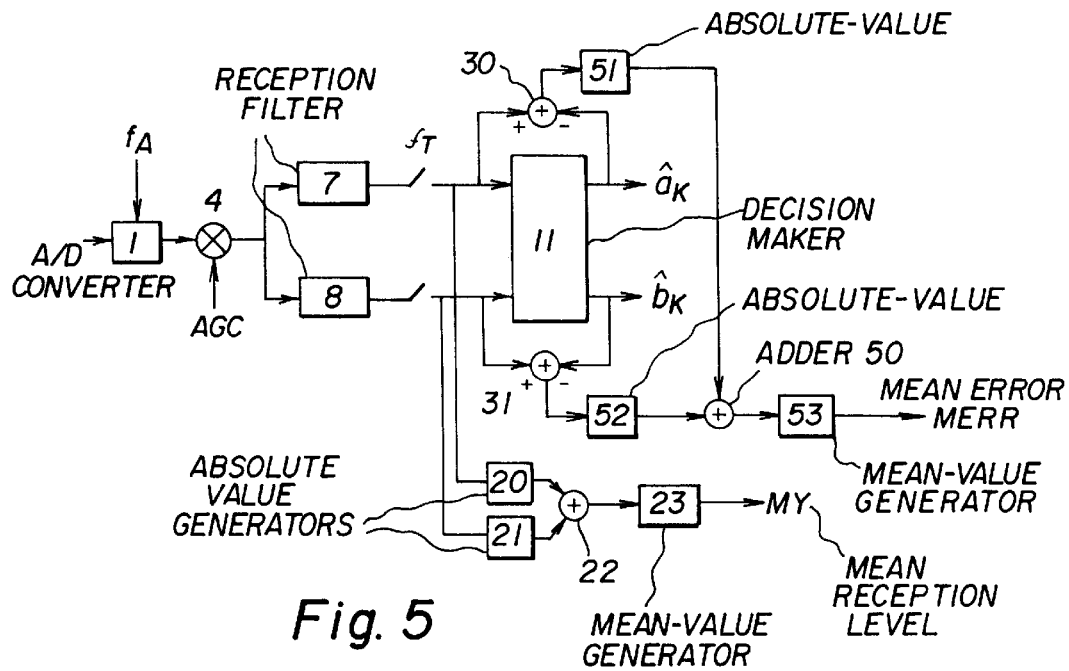
FIG. 5 is a block diagram with a derivation of mean values for generating ENABLE signals.

FIG. 5 shows a representation of required mean values for generating the ENABLE signals. In order to generate ENABLE signals, use is made, on one hand, of a mean error MERR downstream of the decision maker 11, which is produced by adding absolute values, produced in appropriate absolute-value generators 51, 52, of the decision errors $\Delta\hat{a}_k$ and $\Delta\hat{b}_k$ in an adder 50 with subsequent averaging in a mean-value generator 53. Use is made, on the other hand, of a mean reception level MY downstream of the reception filtering, the generation of which has already been explained in conjunction with FIG. 2. In this case, the mean error MERR downstream of the decision maker 11 represents the absolute averaged mean value of the two decision errors $\Delta\hat{a}_k$ and $\Delta\hat{b}_k$.

Figure 6:
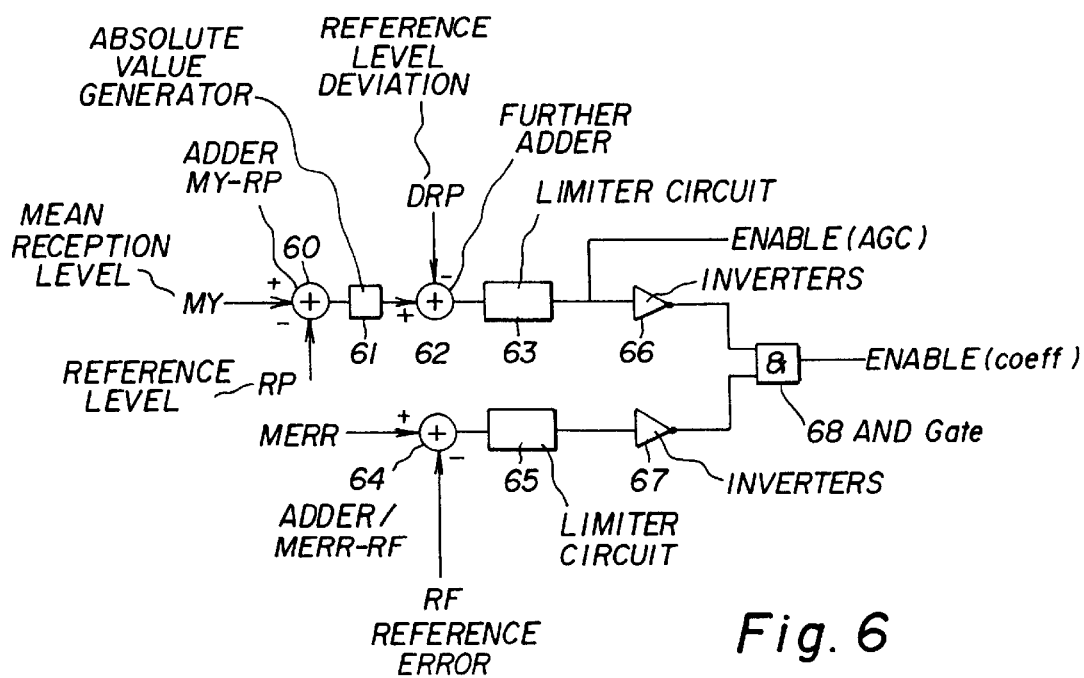
FIG. 6 is a block diagram of a circuit for generating the ENABLE signals.

FIG. 6 shows a block diagram illustrating generation of the two ENABLE signals which control the level regulation and the regulation of the filter coefficients.

A reference level RP is subtracted from the mean reception level MY in an adder 60 in order to generate a first ENABLE signal for controlling the gain factor AGC. The absolute magnitude of a value which is thus produced is formed in an absolute-value generator 61. A reference level deviation DRP is subtracted from this absolute value in a further adder 62. A logic one is generated at the output of a downstream limiter circuit 63 when the input value is greater than or equal to zero. A logic zero is generated if the input value of the limiter circuit 63 is less than zero. This signal forms the ENABLE signal ENABLE(AGC) for the level regulator 3.

In order to generate a second ENABLE signal ENABLE (coeff) for controlling the coefficient regulation, a reference error RF is subtracted from the mean error MERR in an adder 64 downstream of the decision maker 11. A downstream limiter circuit 65 generates a logic one at its output when an output signal of the adder 64 is greater than or equal to zero. The limiter circuit 65 generates a logic zero at its output if the output signal of the adder 64 is less than zero. The two output signals of the limiter circuits 63 and 65 are inverted in inverters 66 and 67, and the inverted signals are supplied to an AND gate 68 having an output signal which constitutes the desired ENABLE signal for regulating the filter coefficients. Combining the ENABLE signal for controlling the regulation of the filter coefficients ensures that the second ENABLE signal is active, that is to say logic "1", for coefficient regulation only when the first ENABLE signal of the level regulator is inactive, that is to say logic "0".

I claim:

1. A method for controlling a CAP receiver, which comprises:

converting an input signal with a clock-controlled A/D converter;

providing a digital level-control circuit downstream of the A/D converter;

providing an adaptive controlled reception filtering system with two parallel filters downstream of the level-control circuit;

providing a decision maker downstream of the adaptive reception filtering system for outputting reconstructed signal coordinates;

decoupling the digital level-control circuit from the adaptive reception filtering system by activating one of an adjustment of the digital level-control circuit and a coefficient adjustment of the adaptive reception filtering system; and decoupling clock control of the A/D converter from the adaptive reception filtering system.

2. The method according to claim 1, which further comprises generating first and second ENABLE signals for controlling the decoupling, activating the digital level-control circuit with the first ENABLE signal, and activating the coefficient adjustment of the adaptive reception filtering system with the second ENABLE signal.

3. The method according to claim 2, which further comprises generating the ENABLE signals by using a mean value of decision errors and a mean value of a reception level.

4. The method according to claim 3, which further comprises determining the mean value of the reception level from signal values downstream of the filters.

5. The method according to claim 3, which further comprises comparing the mean value of the reception level with a prescribed reference value, and setting the first ENABLE signal to one and setting the second ENABLE signal to zero when the mean value of the reception level is greater than the reference value.

6. The method according to claim 4, which further comprises comparing the mean value of the reception level with a prescribed reference value, and setting the first ENABLE signal to one and setting the second ENABLE signal to zero when the mean value of the reception level is greater than the reference value.

7. The method according to claim 5, which further comprises setting the first ENABLE signal to zero when the mean value of the reception level is less than the reference value, and not setting the second ENABLE signal to one until the mean decision error is lower than a predetermined threshold.

8. The method according to claim 6, which further comprises setting the first ENABLE signal to zero when the mean value of the reception level is less than the reference value, and not setting the second ENABLE signal to one until the mean decision error is lower than a predetermined threshold.

9. The method according to claim 1, which further comprises using only a four-stage CAP signal when operating in a starting phase.

10. The method according to claim 1, which further comprises controlling a gain with the level-control circuit-for yielding a prescribed level value at an output of the reception filter pair.

11. The method according to claim 1, which further comprises controlling the coefficient adjustment with a respective decision error.

12. The method according to claim 1, which further comprises deriving the clock control from values upstream and downstream of the decision maker and from a coefficient of the filters.

13. An adaptive CAP receiver, comprising:
a clock-controlled A/D converter with a sampling clock, for converting an input signal;
a digital level-control circuit with a digital level, connected downstream of said A/D converter;
an adaptive controlled reception filtering system with two parallel filters connected downstream of said digital level-control circuit;
a decision maker connected downstream of said adaptive controlled reception filtering system for outputting reconstructed signal coordinates; and
said digital level-control circuit and said adaptive reception filtering system being decoupled by activating one of an adjustment of said digital level-control circuit and a coefficient adjustment of said adaptive reception filtering system, and clock control of said A/D converter and said adaptive reception filtering system being decoupled, for controlling said sampling clock, said digital level and said adaptive reception filtering system.

* * * * *